(12) United States Patent
Kondo et al.

(10) Patent No.: US 12,122,913 B2
(45) Date of Patent: Oct. 22, 2024

(54) POLYSTYRENE RESIN COMPOSITION

(71) Applicant: IDEMITSU KOSAN CO., LTD., Tokyo (JP)

(72) Inventors: Ryosuke Kondo, Novi, MI (US); Takaaki Uchida, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 575 days.

(21) Appl. No.: 17/418,433

(22) PCT Filed: Dec. 25, 2019

(86) PCT No.: PCT/JP2019/050901
§ 371 (c)(1),
(2) Date: Jun. 25, 2021

(87) PCT Pub. No.: WO2020/138199
PCT Pub. Date: Jul. 2, 2020

(65) Prior Publication Data
US 2021/0395521 A1   Dec. 23, 2021

(30) Foreign Application Priority Data
Dec. 27, 2018  (JP) ................................ 2018-245482

(51) Int. Cl.
*C08L 77/06*  (2006.01)
(52) U.S. Cl.
CPC .......... *C08L 77/06* (2013.01); *C08L 2205/03* (2013.01); *C08L 2205/08* (2013.01)
(58) Field of Classification Search
CPC ... C08L 77/06; C08L 2205/08; C08L 2205/03
See application file for complete search history.

(56) References Cited

U.S. PATENT DOCUMENTS 6,013,709 A * 1/2000 Masuyama ............ C08K 5/005
524/282

FOREIGN PATENT DOCUMENTS

| CN | 105602135 A | * 5/2016 | ............ C08L 25/06 |
|---|---|---|---|
| JP | H03-126744 A | 5/1991 | |
| JP | H08-319385 A | 12/1996 | |
| JP | H08-319386 A | 12/1996 | |
| JP | 2013-119571 A | 6/2013 | |

OTHER PUBLICATIONS

English machine translation of JP 08319386A. (Year: 1996).*
English machine translation of CN 105602135A (Year: 2016).*
Office Action issued in corresponding Chinese Patent Application No. 201980086051.1 dated Sep. 9, 2023 (27 pages).
International Searching Authority, "International Search Report," issued in connection with International Patent Application No. PCT/JP2019/050901, dated Mar. 3, 2020.
International Searching Authority, "Written Opinion," issued in connection with International Patent Application No. PCT/JP2019/050901, dated Mar. 3, 2020.
Korean Office Action issued in connection with KR Appl. Ser. No. 10-2021-7018305 dated Apr. 21, 2023.
Korean Office Action issued in connection with KR Appl. Ser. No. 10-2021-7018305 dated Jul. 20, 2023.
Notice of Reasons for Refusal issued in corresponding Japanese Patent Application No. 2018-245482 dated Jun. 28, 2022.

* cited by examiner

*Primary Examiner* — John E Uselding
(74) *Attorney, Agent, or Firm* — Foley & Lardner LLP

(57) ABSTRACT

There is provided a polystyrene resin composition including: (A) a polyamide; (B) a polystyrene resin having a syndiotactic structure; (C) a compatibilizer which has a polar group reactive with the polyamide (A), and which is compatible with the polystyrene resin (B); (D) a particular hindered phenol compound; and (E) an inorganic filler, wherein the amount of the polystyrene resin (B) is 10.0 to 30.0% by weight, and the amount of the hindered phenol compound (D) is 0.3 to 1.0% by weight per 100% by weight of the total amount of the components (A) to (E).

8 Claims, No Drawings

POLYSTYRENE RESIN COMPOSITION

CROSS-REFERENCE TO RELATED APPLICATIONS

The present application claims priority under 37 U.S.C. § 371 to International Patent Application No. PCT/JP2019/050901, filed Dec. 25, 2019, which claims priority to and the benefit of Japanese Patent Application No. 2018-245482, filed on Dec. 27, 2018. The contents of these applications are hereby incorporated by reference in their entireties.

TECHNICAL FIELD

The present invention relates to a polystyrene resin composition.

BACKGROUND ART

A polystyrene resin composition having a syndiotactic structure (hereinafter sometimes abbreviated as SPS) is known to have excellent mechanical strength, heat resistance, electrical properties, dimensional stability upon absorption of water, chemical resistance, etc., and is expected to be used in many applications. In particular, because of the excellent chemical resistance, heat resistance, electrical properties, and dimensional stability upon water absorption of SPS, its use for electrical or electronic device materials, automotive electrical components, home electric appliances, various machine parts, industrial materials, etc. has been receiving attention.

It is known that a resin composition with an excellent balance of strength, toughness, heat resistance, chemical resistance, moldability, etc. can be obtained by blending an SPS and a polyamide. For example, PTL 1 discloses a styrene resin composition comprising an SPS resin, a polyamide and a particular polyphenylene ether, blended in particular proportions.

PTL 2 discloses a polystyrene resin composition comprising an SPS resin, a polyamide, a particular compatibilizer, and a particular copper compound, and reports that the composition has enhanced heat aging resistance.

CITATION LIST

Patent Literature

PTL 1: JP 03-126744A
PTL 2: JP 08-319385A

SUMMARY OF INVENTION

Technical Problem

While the polystyrene resin composition disclosed in PTL 2 has improved heat aging resistance, it is necessary to use a halide as the copper compound in order to obtain a sufficient heat aging resistance. A copper halide compound may cause problems such as precipitation of the halide on a metal part, located adjacent to a molded product of the composition, especially in a hot and humid environment, resulting in degradation of product performance.

On the other hand, a polyamide resin composition containing a phenolic antioxidant and a sulfur-containing antioxidant has been proposed. Such a composition, however, is not suited for practical use because of its insufficient long-term heat resistance and physical properties. Further, an optimization of fluidity is required to produce a large-sized molded product or a molded product having a complicated shape by injection molding.

Solution to Problem

The present inventors, through intensive studies made with a view to obtaining a resin composition which contains a polystyrene resin having a syndiotactic structure, and which has excellent long-term heat resistance and excellent fluidity, have found that the above problem can be solved by a resin composition including an SPS, a polyamide, a compatibilizer, a particular hindered phenol compound, and an inorganic filler, the SPS and the particular hindered phenol compound being contained in particular proportions. Thus, the present invention relates to the following.

[1] A polystyrene resin composition including: (A) a polyamide; (B) a polystyrene resin having a syndiotactic structure; (C) a compatibilizer which has a polar group reactive with the polyamide (A), and which is compatible with the polystyrene resin (B); (D) at least one hindered phenol compound selected from the group consisting of N,N'-hexane-1,6-diylbis[3-(3,5-di-tert-butyl-4-hydroxyphenyl propionamide)] and 2',3'-bis[3-[3,5-di-tert-butyl-4-hydroxyphenyl]propionyl]hydrazine; and (E) an inorganic filler, wherein the amount of the polystyrene resin (B) is 10.0% by weight or more and 30.0% by weight or less, and the amount of the hindered phenol compound (D) is 0.3% by weight or more and 1.0% by weight or less per 100% by weight of the total amount of the components (A) to (E).

[2] The polystyrene resin composition as described in [1] above, wherein when the amount of the polyamide (A) is denoted by x % by weight and the amount of the polystyrene resin (B) is denoted by y % by weight per 100% by weight of the total amount of the components (A) to (E), x is larger than y (x>y).

[3] The polystyrene resin composition as described in [1] or [2] above, wherein the amount of the polyamide (A) is 40.0% by weight or more and 80.0% by weight or less per 100% by weight of the total amount of the components (A) to (E).

[4] The polystyrene resin composition as described in any one of [1] to [3] above, wherein the amount of the compatibilizer (C) is 1.0% by weight or more and 10.0% by weight or less per 100% by weight of the total amount of the components (A) to (E).

[5] The polystyrene resin composition as described in any one of [1] to [4] above, wherein the amount of the inorganic filler (E) is 25.0% by weight or more and 50.0% by weight or less per 100% by weight of the total amount of the components (A) to (E).

[6] The polystyrene resin composition as described in any one of [1] to [5] above, wherein the hindered phenol compound (D) is N,N'-hexane-1,6-diylbis[3-(3,5-di-tert-butyl-4-hydroxyphenyl propionamide)].

[7] The polystyrene resin composition as described in any one of [1] to [6] above, wherein the inorganic filler (E) is a glass filler.

[8] A molded product comprising the polystyrene resin composition as described in any one of [1] to [7] above.

Advantageous Effects of Invention

According to the present invention, it is possible to obtain a polystyrene resin composition having excellent long-term heat resistance and excellent fluidity. The polystyrene resin composition of the present invention is excellent in mechanical properties, and has excellent long-term heat resistance such as high tensile strength retention and high tensile elongation retention.

DESCRIPTION OF EMBODIMENTS

The present inventors, through intensive studies, have found that the above problem can be solved by using an SPS and a particular hindered amine compound in particular proportions in a composition. Embodiments of the present invention will now be described in detail.

As used herein, the expression "XX to YY" means "XX or more and YY or less". An amount, a component, a feature, etc., which are described as preferable herein, may be arbitrarily employed, and a combination thereof will be more preferred.

The polystyrene resin composition of the present invention includes: (A) a polyamide; (B) a polystyrene resin having a syndiotactic structure; (C) a compatibilizer which has a polar group reactive with the polyamide (A), and which is compatible with the polystyrene resin (B); (D) at least one hindered phenol compound selected from the group consisting of N,N'-hexane-1,6-diylbis[3-(3,5-di-tert-butyl-4-hydroxyphenyl propionamide)] and 2',3'-bis[3-[3,5-di-tert-butyl-4-hydroxyphenyl]propionyl]hydrazine; and (E) an inorganic filler, wherein the amount of the polystyrene resin (B) is 10.0% or more by weight and 30.0% by weight or less, and the amount of the hindered phenol compound (D) is 0.3% by weight or more and 1.0% by weight or less per 100% by weight of the total amount of the components (A) to (E).

<Polyamide (A)>

Any known polyamide can be used as the polyamide (A).

Examples of appropriate polyamides may include polyamide-4, polyamide-6, polyamide-6,6, polyamide-3,4, polyamide-12, polyamide-11, polyamide-6,10, polyamide-4T, polyamide-6T, polyamide-9T and polyamide-10T, and a polyamide obtained from adipic acid and m-xylylenediamine. Among them, polyamide-6,6 is preferred.

<Polystyrene resin (B)>

The polystyrene resin (B) is an SPS having a highly syndiotactic structure. As used herein, "syndiotactic" means that a high proportion of phenyl rings in adjacent styrene units are arranged alternately (hereinafter referred to as syndiotacticity) with respect to a plane formed by the main chain of the polymer block.

The tacticity can be quantitatively determined by the nuclear magnetic resonance method ($^{13}$C-NMR method) using isotopic carbon. The proportions of consecutive constitutional units, for example, consecutive two monomer units as a diad, consecutive three monomer units as a triad, and consecutive five monomer units as a pentad, can be quantitatively determined by the $^{13}$C-NMR method.

In the present invention, the "polystyrene resin having a highly syndiotactic structure" refers to a polystyrene, a poly(hydrocarbon-substituted styrene), a poly(halostyrene), a poly(haloalkylstyrene), a poly(alkoxystyrene), a poly(vinyl benzoate ester), a hydrogenated polymer or a mixture thereof, or a copolymer comprising such a constituent unit as a main component, each having such syndiotacticity that the proportion of a racemic diad (r) is generally 75% by mol or more, preferably 85% by mol or more, or the proportion of a racemic pentad (rrrr) is generally 30% by mol or more, preferably 50% by mol or more.

Examples of the poly(hydrocarbon-substituted styrene) include poly(methylstyrene), poly(ethylstyrene), poly(isopropylstyrene), poly(tert-butylstyrene), poly(phenyl)styrene, poly(vinylnaphthalene), and poly(vinylstyrene). Examples of the poly(halostyrene) include poly(chlorostyrene), poly(bromostyrene), and poly(fluorostyrene). An example of the poly(haloalkylstyrene) is poly(chloromethylstyrene). Examples of the poly(alkoxystyrene) include poly(methoxystyrene) and poly(ethoxystyrene).

Examples of the comonomer components of the copolymer comprising such a constituent unit include, besides the monomers of the above styrene polymers, olefin monomers such as ethylene, propylene, butene, hexene, and octene; diene monomers such as butadiene and isoprene; and polar vinyl monomers such as cyclic olefin monomers, cyclic diene monomers, methyl methacrylate, maleic anhydride, and acrylonitrile.

Particularly preferable ones of the above-listed styrene polymers are polystyrene, poly(p-methylstyrene), poly(m-methylstyrene), poly(p-tert-butylstyrene), poly(p-chlorostyrene), poly(m-chlorostyrene), and poly(p-fluorostyrene).

A copolymer of styrene and p-methylstyrene, a copolymer of styrene and p-tert-butylstyrene, and a copolymer of styrene and divinylbenzene are also preferred.

The polystyrene resin having a syndiotactic structure of the present invention preferably has a weight average molecular weight of $1 \times 10^4$ or more and $1 \times 10^6$ or less, more preferably 50,000 or more and 500,000 or less from the viewpoint of the fluidity of the resin upon molding and the strength of the resulting molded product. When the weight average molecular weight is $1 \times 10^4$ or more, a molded product having a sufficient strength can be obtained. When the weight average molecular weight is $1 \times 10^6$ or less, there will be no problem in the fluidity of the resin upon molding.

Unless otherwise specified, "weight average molecular weight" herein refers to a value as determined in terms of a standard polystyrene, using a calibration curve thereof, from a measured value. The measure value is obtained by gel permeation chromatography as performed at 145° C. by using a GPC apparatus (HLC-8321 GPC/HT) manufactured by Tosoh Corporation, a GPC column (GMHHR-H(S)HTC/HT) manufactured by Tosoh Corporation, and 1,2,4-trichlorobenzene as an eluent. The "weight average molecular weight" is hereinafter sometimes referred to simply as "molecular weight".

The SPS (B) can be produced, for example, by polymerizing a styrene monomer (corresponding to the styrene polymer) using, as a catalyst, a titanium compound and a condensation product of a trialkylaluminum with water (aluminoxane) in an inert hydrocarbon solvent or in the absence of a solvent (see, e.g., Japanese Patent Laid-Open Publication No. 2009-068022).

<Compatibilizer (C)>

A compound which has a polar group reactive with the polyamide (A), and which is compatible with the SPS (B) is used as the compatibilizer (C). The compatibilizer (C) is used to enhance the compatibility between the polyamide (A) and the SPS (B), finely disperse the domains, and increase the interfacial strengths between the respective components. The polar group reactive with the polyamide (A) refers to a functional group reactive with a polar group of the polyamide. Examples include an acid anhydride group, a carboxylic acid group, a carboxylic acid ester group, a carboxylic acid halide group, a carboxylic acid amide group, a carboxylate group, a sulfonic acid group, a sulfonic acid ester group, a sulfonic acid chloride group, a sulfonic acid amide group, a sulfonate group, an epoxy group, an amino group, an imido group, and an oxazoline group.

The compound which is compatible with the SPS (B) refers to a compound having, in the polymer chain, a chain having compatibility with the SPS. The compound can be exemplified by a polymer comprising syndiotactic polystyrene, atactic polystyrene, isotactic polystyrene, a styrene polymer, polyphenylene ether, polyvinyl methyl ether, or the like as a main chain, a block chain or a graft chain.

Specific examples of the compatibilizer (C) include modified styrene polymers such as a styrene-maleic anhydride copolymer (SMA), a styrene-glycidyl methacrylate copolymer, carboxylic acid-terminated polystyrene, epoxy-terminated polystyrene, oxazoline-terminated polystyrene, amine-terminated polystyrene, sulfonated polystyrene, a styrenic ionomer, a styrene-methyl methacrylate graft copolymer, a (styrene-glycidyl methacrylate)-methyl methacrylate graft copolymer, an acid-modified acrylate-styrene graft copolymer, a (styrene-glycidyl methacrylate)-styrene graft copolymer, a polybutylene terephthalate-polystyrene graft copolymer, maleic anhydride-modified SPS, fumaric acid-modified SPS, glycidyl methacrylate-modified SPS, and amine-modified SPS; and modified polyphenylene ether polymers such as a (styrene-maleic anhydride)-polyphenylene ether graft copolymer, maleic anhydride-modified polyphenylene ether, fumaric acid-modified polyphenylene ether, glycidyl methacrylate-modified polyphenylene ether, and amine-modified polyphenylene ether. Among them, modified polyphenylene ether and modified SPS are preferred, and maleic anhydride-modified polyphenylene ether and fumaric acid-modified polyphenylene ether are more preferred.

The above-described modified polyphenylene ether can be obtained by modifying a known polyphenylene ether with a modifier; however, the present invention is not limited to this method as long as the polymer can be used for the purpose of the present invention. Polyphenylene ether is a known compound, and reference may be made to U.S. Pat. Nos. 3,306,874, 3,306,875, 3,257,357 and 3,257,358. Polyphenylene ether is commonly prepared through an oxidative coupling reaction using a di- or tri-substituted phenol in the presence of a copper-amine complex catalyst. The copper-amine complex may be one derived from a primary, secondary or tertiary amine.

Examples of polyphenylene ether include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isoproyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether).

It is possible to use a copolymer derived from two or more phenol compounds which can be used for the preparation of the homopolymer. It is also possible to use a graft or block copolymer of a vinyl aromatic compound, such as polystyrene, and the above-described polyphenylene ether. It is particularly preferred to use poly(2,6-dimethyl-1,4-phenylene ether).

A modifier for modification of polyphenylene ether may be a compound having an ethylenic double bond and a polar group in one molecule. Examples of such a compound include maleic anhydride, maleic acid, fumaric acid, a maleic acid ester, a fumaric acid ester, maleimide and an N-substituted derivative thereof, a maleic acid salt, a fumaric acid salt, acrylic acid, an acrylic acid ester, acrylamide, an acrylic acid salt, methacrylic acid, a methacrylic acid ester, methacrylamide, a methacrylic acid salt, and glycidyl methacrylate. Among them, maleic anhydride, fumaric acid and glycidyl methacrylate are preferred. These modifiers may be used singly or in a combination of two or more.

A modified polyphenylene ether can be obtained by, for example, reacting a polyphenylene ether with the modifier in the presence of a solvent or another resin. There is no particular limitation on a method for the modification, and any known method can be used. Exemplary methods include a method which involves melting and kneading the materials at a temperature in the range of 150 to 350° C. by using a roll mill, a Banbury mixer, an extruder, or the like to perform a reaction, and a method which involves heating the materials in a solvent such as benzene, toluene or xylene to perform a reaction. In order to facilitate the reaction, it is effective to allow a radical generator to exist in the reaction system. Examples of the radical generator include benzoyl peroxide, di-tert-butyl peroxide, dicumyl peroxide, tert-butyl peroxybenzoate, azobisisobutyronitrile, azobisisovaleronitrile and 2,3-diphenyl-2,3-dimethylbutane. A method comprising melting and kneading the materials in the presence of such a radical generator is particularly preferred.

A modified SPS having a polar group may also be used as the compatibilizer (C). While the modified SPS can be obtained by modifying the above-described SPS with a modifier, the present invention is not limited to this method as long as the modified SPS can be used for the objective of the present invention. While there is no particular limitation on an SPS to be modified, a copolymer of styrene and a substituted styrene is preferred for its good compatibility with other components. While there is no particular limitation on the compositional ratio of the copolymer, the content of the substituted styrene units is preferably in the range of 3 to 50% by mol. When the content is 3% by mol or more, the modification of the copolymer can be effected with ease. When the content is 50% by mol or less, the copolymer can have good compatibility with other components.

Examples of particularly preferable substituted styrenes include alkylstyrenes such as methylstyrene, ethylstyrene, isopropylstyrene, tert-butylstyrene, and vinylstyrene; halogenated styrenes such as chlorostyrene, bromostyrene, and fluorostyrene; haloalkyl styrenes such as chloromethylstyrene; and alkoxystyrenes such as methoxystyrene and ethoxystyrene. These substituted styrenes may be used singly or in a combination of two or more. The above-described polymer having an isotactic structure can also be used in an amount of 5% by weight or less based on the amount of SPS because such an amount can maintain the heat resistance of the composition.

A modifier for modification of SPS may be a compound having an ethylenic double bond and a polar group in one molecule. Examples of such a modifier include maleic anhydride, maleic acid, fumaric acid, a maleic acid ester, a fumaric acid ester, maleimide and an N-substituted derivative thereof, a maleic acid salt, a fumaric acid salt, acrylic acid, an acrylic acid ester, acrylamide, an acrylic acid salt, methacrylic acid, a methacrylic acid ester, methacrylamide, a methacrylic acid salt, and glycidyl methacrylate. Among them, maleic anhydride, fumaric acid and glycidyl methacrylate are preferred. These modifiers may be used singly or in a combination of two or more.

A modified SPS can be obtained by, for example, reacting an SPS with the modifier in the presence of a solvent or another resin. There is no particular limitation on a method for the modification; any known method can be used. Exemplary methods include a method which involves melting and kneading the materials at a temperature in the range of 150 to 350° C. by using a roll mill, a Banbury mixer, an extruder, or the like to carry out a reaction, and a method which involves heating the materials in a solvent such as benzene, toluene or xylene to carry out a reaction. In order to facilitate the reaction, it is effective to allow a radical generator to exist in the reaction system. Examples of the radical generator include benzoyl peroxide, di-tert-butyl peroxide, dicumyl peroxide, tert-butyl peroxybenzoate, azobisisobutyronitrile, azobisisovaleronitrile and 2,3-diphenyl-2,3-dimethylbutane. A method comprising melting and kneading the materials in the presence of such a radical generator is particularly preferred. Maleic anhydride-modified SPS, fumaric acid-modified SPS and glycidyl methacrylate-modified SPS are preferably used as a modified SPS.

<Hindered Phenol Compound (D)>

The hindered phenol compound (D) is at least one compound selected from N,N'-hexane-1,6-diylbis[3-(3,5-di-tert-butyl-4-hydroxyphenyl propionamide)] and 2',3'-bis[3-[3,5-di-tert-butyl-4-hydroxyphenyl]propionyl]hydrazine. Owing to the inclusion of the hindered phenol compound (D), the polystyrene resin composition of the present invention can have excellent long-term heat resistance.

The use of N,N'-hexane-1,6-diylbis[3-(3,5-di-tert-butyl-4-hydroxyphenyl propionamide)] as the hindered phenol compound (D) is particularly preferred in terms of long-term heat resistance and mechanical properties.

<Inorganic Filler (E)>

An inorganic filler which has been surface-treated with a coupling agent to increase the adhesion to the SPS (B) is preferably used as the inorganic filler (E). The inorganic filler may be of any known form such as a fibrous form, a granular form or a powdery form. Examples of the fibrous filler include glass fibers, carbon fibers, whiskers, ceramic fibers, and metal fibers. The whiskers may be made of boron, alumina, silica, silicon carbide, or the like. The ceramic fibers may be made of gypsum, potassium titanate, magnesium sulfate, magnesium oxide, or the like. The metal fibers may be made of copper, aluminum, steel, or the like. The inorganic filler may have a cloth shape, a mat shape, a cut-bundle shape, a short-fiber shape, a filament shape, or a whisker shape. In the case of a cut-bundle shape, its length is preferably 0.05 to 50 mm, and its fiber diameter is preferably 5 to 20 μm. In the case of a cloth or mat shape, its length is preferably 1 mm or more, more preferably 5 mm or more.

The granular or powdery filler may be made of, for example, talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metal powder, glass powder, glass flakes and glass beads.

Of these inorganic fillers, a glass filler such as glass filaments, glass fibers, glass roving, glass mat, glass powder, glass flakes, or glass beads is particularly preferred.

A silane coupling agent or a titanium coupling agent, for example, can be used as the coupling agent for the surface treatment of the inorganic filler. Specific examples of the silane coupling agent include triethoxysilane, vinyltris(β-methoxyethoxy)silane, γ-methacryloxypropyltrimethoxysilane, Y-glycidoxypropyltrimethoxysilane, β-(1,1-epoxycyclohexyl)ethyltrimethoxy silane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-aminopropyltrimethoxysilane, γ-aminopropyl-tris(2-methoxy-ethoxy)silane, N-methyl-γ-aminopropyltrimethoxysilane, N-vinylbenzyl-γ-aminopropyl triethoxysilane, 3-ureidopropyltrimethoxysilane, 3-4,5-dihydroimidazole-propyltriethoxysilane, hexamethyldisilazane, N,N-bis(trimethylsilyl)urea, and 3-triethoxysilyl-N-(1,3-dimethylbutylidene)propylamine.

Among them, aminosilanes and epoxysilanes, such as γ-aminopropyltrimethoxysilane, N-β-(aminoethyl)-γ-aminopropyltrimethoxysilane, γ-glycidoxypropyltrimethoxy silane and β-(3,4-epoxycyclohexyl)ethyltrimethoxysilane, are preferred.

Specific examples of the titanium coupling agent include isopropyltriisostearoyl titanate, isopropyltridodecylbenzenesulfonyl titanate, isopropyltris(dioctylpyrophosphate) titanate, tetraisopropylbis (dioctylphosphite) titanate, tetraoctylbis(ditridecylphosphite) titanate, tetra(1,1-diallyloxymethyl-1-butyl)bis(ditridecyl)phosphite titanate, bis(dioctylpyrophosphate)oxyacetate titanate, bis (dioctylpyrophosphate)ethylene titanate, isopropyltrioctanoyl titanate, isopropyldimethacrylisostearoyl titanate, isopropylisostearoyldiacryl titanate, isopropyltri(dioctylphosphate) titanate, isopropyltricumylphenyl titanate, isopropyltri(N-amidoethyl, aminoethyl) titanate, dicumylphenyloxyacetate titanate, and diisostearoylethylene titanate. Among them, isopropyltri(N-amidoethyl, aminoethyl) titanate is preferred.

There is no particular limitation on a method for performing the surface treatment of the inorganic filler using the above-described coupling agent; any known common method can be used. Exemplary methods include a sizing treatment which involves applying a sizing agent, which is a solution or suspension of the coupling agent in an organic solvent, to the filler; dry mixing using a Henschel mixer, a Super mixer, a Loedige mixer, a V-shaped blender, or the like; a spray method; an integral blending method; and a dry concentrate method. An appropriate method may be selected depending on the shape of the inorganic filler. Among them, the sizing treatment, dry mixing, and a spray method are preferred.

A film-forming material for glass, for example, may be used together with the coupling agent. There is no particular limitation on the film-forming material. Examples include a polyester polymer, a urethane polymer, an epoxy polymer, an acrylic polymer, a vinyl acetate polymer, and a polyether polymer.

In the polystyrene resin composition of the present invention, the amount of the SPS (B) is required to be 10.0% by weight or more and 30.0% by weight or less, and the amount of the particular hindered phenol compound (D) is required to be 0.3% by weight or more and 1.0% by weight or less per 100% by weight of the total amount of the polyamide (A), the SPS (B), the compatibilizer (C), the particular hindered phenol compound (D), and the inorganic filler (E). If the amount of the SPS (B) and the amount of the compound (D) do not meet the above ranges, the composition has poor long-term heat resistance and exhibits a decrease in mechanical strength such as tensile breaking strength and tensile breaking elongation.

The amount of the polyamide (A) is preferably 40.0% by weight or more and 80.0% by weight or less per 100% by weight of the total amount of the components (A) to (E) contained in the polystyrene resin composition of the present invention. When the amount of the polyamide (A) is 40.0% by weight or more, the composition can have excellent mechanical strength such as high tensile breaking strength and high tensile breaking elongation. When the amount of the polyamide (A) is 80.0% by weight or less, the composition can have excellent hydrolysis resistance.

The amount of the polyamide (A) is more preferably 42.0% by weight or more, even more preferably 45.0% by weight or more, and still more preferably 47.0% by weight or more, and is more preferably 78.0% by weight or less, even more preferably 75.0% by weight or less, and still more preferably 70.0% by weight or less per 100% by weight of the total amount of the components (A) to (E).

As described above, the amount of the SPS (B) is required to be 10.0% by weight or more and 30.0% by weight or less per 100% by weight of the total amount of the components (A) to (E) contained in the polystyrene resin composition of the present invention. If the amount of the SPS (B) is less than 10.0% by weight, a molded product of the composition undesirably has poor hydrolysis resistance. On the other hand, the use of SPS (B) in an amount of more than 30.0% by weight adversely affects the mechanical strength of the composition.

The amount of the SPS (B) is preferably 14.0% by weight or more, more preferably 16% by weight or more, and even more preferably 18% by weight or more, and is preferably 28% by weight or less, more preferably 26% by weight or less, and even more preferably 24% by weight or less per 100% by weight of the total amount of the components (A) to (E).

When the amount of the polyamide (A) is denoted by x % by weight and the polystyrene resin (B) is denoted by y % by weight based on the total weight of the polystyrene resin composition of the present invention, x is preferably larger than y (x>y). Excellent mechanical strength of the composition can be obtained when the relation is satisfied. The amount x (% by weight) of the polyamide (A) and the amount y (% by weight) of the SPS are described above.

The amount of the compatibilizer (C) is preferably 1.0% by weight or more and 10.0% by weight or less per 100% by weight of the total amount of the components (A) to (E) contained in the polystyrene resin composition of the present invention. When the amount of the compatibilizer (C) is 1.0% by weight or more, surface roughening of pellets or a molded product, produced from the composition of the present invention, can be prevented. This leads to superior production stability. When the amount of the compatibilizer (C) is 10.0% by weight or less, the composition can have high fluidity.

The amount of the compatibilizer (C) is more preferably 1.5% by weight or more, even more preferably 2.0% by weight or more, still more preferably 2.5% by weight or more, and particularly preferably 3.0% by weight or more, and is more preferably 8.0% by weight or less, even more preferably 6.0% by weight or less, still more preferably 4.5% by weight or less, and particularly preferably 3.5% by weight not more than per 100% by weight of the total amount of the components (A) to (E).

As described above, the amount of the particular hindered phenol compound (D) is required to be 0.3% by weight or more and 1.0% by weight or less per 100% by weight of the total amount of the components (A) to (E) contained in the polystyrene resin composition of the present invention. If the amount of the hindered phenol compound (D) is less than 0.3% by weight, the composition has poor long-term heat resistance, and exhibits a decrease in mechanical strength such as tensile breaking strength and tensile breaking elongation. On the other hand, if the amount of the hindered phenol compound (D) exceeds 1.0% by weight, the composition has poor moldability, which may cause problems such as bleeding onto a mold upon molding and poor product appearance.

The amount of the hindered phenol compound (D) is preferably 0.35% by weight or more, more preferably 0.38% by weight or more, and even more preferably 0.41% by weight or more, and is preferably 0.95% by weight or less, more preferably 0.90% by weight or less, and even more preferably 0.85% by weight or less per 100% by weight of the total amount of the components (A) to (E).

The amount of the inorganic filler (E) is preferably 25.0% by weight or more and 50.0% by weight or less per 100% by weight of the total amount of the components (A) to (E) contained in the polystyrene resin composition of the present invention. When the amount of the inorganic filler (E) is 25.0% by weight or more, a molded product obtained from the composition has excellent mechanical strength. When the amount of the inorganic filler (E) is 50.0% by weight or less, the composition can have good moldability with excellent fluidity.

The amount of the inorganic filler (E) is more preferably 26.0% by weight or more, even more preferably 28.0% by weight or more, and still more preferably 29.5% by weight or more, and is more preferably 45.0% by weight or less, even more preferably 40.0% by weight or less, still more preferably 35.0% by weight or less, and particularly preferably 30.0% by weight or less per 100% by weight of the total amount of the components (A) to (E).

Other Components

The polystyrene resin composition of the present invention may contain other components which are common additives, such as a thermoplastic resin, a rubber-like elastic material, an antioxidant, a filler, a crosslinking agent, a crosslinking aid, a nucleating agent, a plasticizer, a compatibilizer, a colorant and/or an antistatic agent, as long as the intended effect of the present invention is not impaired.

Examples of the thermoplastic resin include styrene polymers such as polystyrene having an atactic structure, polystyrene having an isotactic structure, an AS resin, and an ABS resin, and also include condensed polymers such as polyester (e.g., polyethylene terephthalate), polycarbonate, polyphenylene oxide, polysulfone, polyether (e.g., polyether sulfone), polyamide, polyphenylene sulfide (PPS), and polyoxymethylene; acrylic polymers such as polyacrylic acid, polyacrylic acid ester, and polymethyl methacrylate; polyolefins such as polyethylene, polypropylene, polybutene, poly-4-methylpentene-1, and an ethylene-propylene copolymer; halogen-containing vinyl compound polymers such as polyvinyl chloride, polyvinylidene chloride, and polyvinylidene fluoride; and mixtures thereof.

Various materials can be used for the rubber-like elastic material. Examples include natural rubber, polybutadiene, polyisoprene, polyisobutylene, neoprene, polysulfide rubber, Thiokol rubber, acrylic rubber, urethane rubber, silicone rubber, epichlorohydrin rubber, a styrene-butadiene block copolymer (SBR), a hydrogenated styrene-butadiene block copolymer (SEB), a styrene-butadiene-styrene block copolymer (SBS), a hydrogenated styrene-butadiene-styrene block copolymer (SEBS), a styrene-isoprene block copolymer (SIR), a hydrogenated styrene-isoprene block copolymer (SEP), a styrene-isoprene-styrene block copolymer (SIS), a hydrogenated styrene-isoprene-styrene block copolymer (SEPS), a styrene-butadiene random copolymer, a hydrogenated styrene-butadiene random copolymer, a styrene-ethylene-propylene random copolymer, a styrene-ethylene-butylene random copolymer, ethylene-propylene rubber (EPR), ethylene-propylene-diene rubber (EPDM), and core-shell type particulate elastic materials such as acrylonitrile-butadiene-styrene core-shell rubber (ABS), methyl methacrylate-butadiene-styrene core-shell rubber (MBS), methyl methacrylate-butyl acrylate-styrene core-shell rubber (MAS), octyl acrylate-butadiene-styrene core-shell rubber (MABS), alkyl acrylate-butadiene-acrylonitrile-styrene core-shell rubber (AABS), butadiene-styrene core-shell rubber (SBR), and siloxane-containing core-shell rubbers including methyl methacrylate-butyl acrylate-siloxane, and rubbers obtained by modifying these materials.

Among them, SBR, SBS, SEB, SEBS, SIR, SEP, SIS, SEPS, core-shell rubbers, and rubber obtained by modifying these materials are preferred.

Examples of the modified rubber-like elastic materials include materials obtained by modifying styrene-butyl acrylate copolymer rubber, a styrene-butadiene block copolymer (SBR), a hydrogenated styrene-butadiene block copolymer (SEB), a styrene-butadiene-styrene block copolymer (SBS), a hydrogenated styrene-butadiene-styrene block copolymer (SEBS), a styrene-isoprene block copolymer (SIR), a hydrogenated styrene-isoprene block copolymer (SEP), a styrene-isoprene-styrene block copolymer (SIS), a hydrogenated styrene-isoprene-styrene block copolymer (SEPS), a styrene-butadiene random copolymer, a hydrogenated styrene-butadiene random copolymer, a styrene-ethylene-propylene random copolymer, a styrene-ethylene-butylene random copolymer, ethylene-propylene rubber (EPR), ethylene-propylene-diene rubber (EPDM), etc. with a modifier having a polar group.

Among them, rubbers obtained by modifying SEB, SEBS, SEP, SEPS, EPR, and EPDM are preferred. Specific examples include maleic anhydride-modified SEBS, maleic anhydride-modified SEPS, maleic anhydride-modified EPR, maleic anhydride-modified EPDM, epoxy-modified SEBS, and epoxy-modified SEPS. The rubber-like elastic materials may be used singly or in a combination of two or more.

Besides the inorganic filler (E), the polystyrene resin composition of the present invention may also contain an organic filler. The organic filler is, for example, organic synthetic fillers and natural plant fibers. Examples of the organic synthetic fillers include wholly aromatic polyamide fibers, polyimide fibers, etc. Such organic fillers may be used singly or in a combination of two or more. The mount of the organic filler is preferably 1 to 350 parts by weight, more preferably 5 to 200 parts by weight per 100 parts by weight of the resin composition. The use of the organic filler in an amount of 1 part by weight or more can achieve a sufficient effect, while the use of the organic filler in an amount of 350 part by weight or less will not lead to poor dispersion of the composition and will not adversely affect the moldability.
<Molded Product>

The polystyrene resin composition of the present invention is obtained by blending and kneading the components (A) to (E), including the SPS resin, and the above-described optional components. The blending and kneading can be performed by a method comprising pre-mixing the components by using a common mixer such as a ribbon blender, a drum tumbler, or a Henschel mixer, and then mixing and kneading the components by using a Banbury mixer, a single-screw extruder, a twin-screw extruder, a multi-screw extruder, a co-kneader, or the like.

Various molded products can be produced by injection molding, injection compression molding, extrusion molding, blow molding, press molding, vacuum molding, foam molding, or the like using, as a raw material, the melt-kneaded polystyrene resin composition of the present invention or pellets obtained through the melt-kneading. In particular, the pellets can be preferably used to produce an injection-molded product by injection molding or injection compression molding.

There is no particular limitation on the shape of a molded product. Examples may include a sheet, a film, fibers, a non-woven fabric, a container, an injection-molded product, and a blow-molded product. Molded products of the polystyrene resin composition of the present invention can be advantageously used for electrical or electronic materials (a connector, a printed circuit board, etc.), industrial structural materials, automotive parts (a connector, a wheel cover, a cylinder head cover, etc.), home appliances, machine parts, and industrial materials such as a pipe, a sheet and a film.

EXAMPLES

The following examples illustrate the present invention in greater detail and are not intended to limit the scope of the invention.
<Molding Conditions>

Components were dry-blended in a Henschel mixer in the proportions (wt. %) described in Table 1. Subsequently, the resin composition was kneaded by using a twin-screw kneader while side-feeding 30 wt. % of glass fibers to produce pellets.

An injection molding machine [SH100A manufacture by Sumitomo Heavy Industries, Ltd.] was used in the following evaluation tests other than the SFL test (2). Dumbbell tensile specimens (type A) were produced according to JIS K 7139: 2009 under the molding conditions of a cylinder temperature of 290° C. and a mold temperature of 80° C.

The following evaluations tests were performed in Examples and Comparative Examples.
(1) MFR The melt flow rate (MFR) of the pellets, obtained in each of the Examples and Comparative Examples, was measured at 300° C. under a load of 2.16 kg according to JIS K 7210-1: 2014. The unit is g/10 min.
(2) SFL Using an injection molding machine [MD100 manufactured by Niigata Machine Techno Co., Ltd.], the pellets obtained in each of the Examples and Comparative Examples were subjected to injection molding under the following conditions: cylinder temperature 290° C., mold temperature 80° C., spiral flow mold having a thickness of 1 mm and a width of 10 mm, and pressure set at 50, 100 and 150 MPa to measure the spiral flow length (SFL) (mm).
(3) Tensile Breaking Strength/Tensile Breaking Elongation Test Dumbbell tensile specimens (type A) were produced under the above-described molding conditions according to JIS K 7139: 2009.

Using a tensile tester (manufactured by Shimadzu Corp., trade name: Autograph AG5000B), the teat specimens were each subjected to a tensile test under the conditions of room temperature, an initial distance between chucks of 100 mm, and a tensile speed of 5 mm/min according to ISO 527-1: 2012 (2nd Edition) to measure the tensile breaking strength (MPa) and the tensile breaking elongation (%).

(4) Heat Resistance Test

The heat resistance of each test specimen upon exposure to heat over a long period of time was evaluated. In particular, the test specimens used in the above test (3) were held in an oven at 120° C. for 1000 hours to carry out heat exposure treatment. The test specimens were taken out of the oven, and subjected to a tensile test to determine the tensile breaking strength retention and the tensile breaking elongation retention before and after the heat exposure treatment. The tensile test was performed according to ISO 527-1: 2012 (2nd Edition) as in the above test (3).

(5) Evaluation of Appearance

The dumbbell tensile specimens, obtained under the above-described molding conditions, were visually observed to evaluate the hue. A specimen was rated "A" when no or little discoloration was observed, and rated "B" when appreciable discoloration was observed.

Examples 1 and 2

Components were blended and kneaded in the proportions (wt. %) described in Table 1 to prepare pellets in the above-described manner. The pellets were injection-molded under the above-described molding conditions to produce the test specimens. For the test specimens, the above evaluation tests were performed. The components used are as follows.

Polyamide (A): Nylon 6,6 [Vydyne (registered trademark) 50BWFS manufactured by Ascend Performance Materials]
SPS (B): [weight average molecular weight 200,000, 90ZC manufactured by Idemitsu Kosan Co., Ltd.]
Compatibilizer (C): fumaric acid-modified polyphenylene ether [CX-1 manufactured by Idemitsu Kosan Co., Ltd.]
Hindered phenol compound (D):
N,N'-hexane-1,6-diylbis[3-(3,5-di-tert-butyl-4-hydroxyphenyl propionamide)]
[Irganox 1098 manufactured by BASF Japan Ltd.]
Inorganic filler (E): glass fibers [ECS03T-249H manufactured by Nippon Electric Glass Co., Ltd.]

Comparative Examples 1 to 5

Components were blended and kneaded in the same manner as in Examples 1 and 2 except that in Comparative Examples 1 to 4, instead of the hindered phenol compound (D), one of the following compounds was used in the proportion shown in Table 1, and in Comparative Example 5, the hindered phenol compound (D) was used in the proportion shown in Table 1. The thus-obtained pellets were injection-molded under the above-described molding conditions to produce the test specimens. For the test specimens, the above evaluation tests were performed.

Copper iodide/potassium iodide compound: [AL-120FF manufactured by PolyAd Services]
Pentaerythritol tetrakis{3(3,5-di-tert-butyl-4-hydroxyphenyl) propionate}: [Irganox 1010 manufactured by BASF Japan Ltd.]
3,9-bis{2-[3-(3-tert-butyl-4-hydroxy-5-methylphenyl) propionyloxy]-1,1-dimethylethyl}-2,4,8,10-tetraoxaspiro[5,5]undecane: [Adecastab AO-80 manufactured by ADEKA Corporation]
Tetraxis[3-(dodecylthio)propionate]methanetetrayltetraxismethylene: [Adecastab AO-412S manufactured by ADEKA Corporation]

TABLE 1

|  |  |  | Examples | | Comp. Examples | | | | |
| --- | --- | --- | --- | --- | --- | --- | --- | --- | --- |
|  |  | Unit | 1 | 2 | 1 | 2 | 3 | 4 | 5 |
| Resin composition | Polyamide (A) | wt. % | 47.6 | 47.2 | 47.8 | 47.6 | 47.6 | 47.6 | 47.8 |
|  | SPS (B) | wt. % | 19.0 | 19.0 | 19.0 | 19.0 | 19.0 | 19.0 | 19.0 |
|  | Compatibilizer (C) | wt. % | 3.0 | 3.0 | 3.0 | 3.0 | 3.0 | 3.0 | 3.0 |
|  | Irganox 1098 (D) | wt. % | 0.4 | 0.8 |  |  |  |  | 0.2 |
|  | AL-120FF (CuI/KI) | wt. % |  |  | 0.2 |  |  |  |  |
|  | Irganox 1010 | wt. % |  |  |  | 0.4 |  |  |  |
|  | Adecastab AO-80 | wt. % |  |  |  |  | 0.4 |  |  |
|  | Adecastab AO-412S | wt. % |  |  |  |  |  | 0.4 |  |
|  | GF (E) | wt. % | 30.0 | 30.0 | 30.0 | 30.0 | 30.0 | 30.0 | 30.0 |
| Evaluation items | MFR | g/10 min | 24 | 29 | 15 | 24 | 25 | 26 | 22 |
|  | SFL     50 MPa | mm | 110 | 117 | 101 | 114 | 112 | 123 | 109 |
|  |         100 MPa | mm | 179 | 187 | 162 | 184 | 182 | 195 | 180 |
|  |         150 MPa | mm | 249 | 262 | 221 | 256 | 253 | 264 | 246 |
|  | Tensile breaking strength | MPa | 179 | 181 | 183 | 180 | 178 | 180 | 181 |
|  | Tensile breaking elongation | % | 2.5 | 2.6 | 2.6 | 2.6 | 2.4 | 2.5 | 2.6 |
|  | Tensile breaking strength retention |  |  |  |  |  |  |  |  |
|  |       0 hr | % | 100 | 100 | 100 | 100 | 100 | 100 | 100 |
|  |       1000 hr |  | 100 | 99 | 100 | 82 | 92 | 73 | 87 |
|  | Tensile breaking elongation retention |  |  |  |  |  |  |  |  |
|  |       0 hr | % | 100 | 100 | 100 | 100 | 100 | 100 | 100 |
|  |       1000 hr |  | 94 | 90 | 94 | 66 | 82 | 63 | 72 |
|  | Hue (visual observation) |  | A | A | B | A | A | A | A |

The data indicates that the compositions of the Examples according to the present invention have excellent mechanical properties, and excellent long-term heat resistance such as high tensile strength retention and high tensile elongation retention and, in addition, have high fluidity. On the other hand, the comparative compositions of Comparative Examples 1 to 4, and the composition of Comparative Examples 5 in which the amount of the hindered phenol compound (D) does not meet the range according to the present invention, are inferior in the retentions of the mechanical properties after the heat resistance test.

The invention claimed is:

1. A polystyrene resin composition comprising:
   (A) a polyamide;
   (B) a polystyrene resin having a syndiotactic structure;
   (C) a compatibilizer which has a polar group reactive with the polyamide (A), and which is compatible with the polystyrene resin (B);
   (D) at least one hindered phenol compound selected from the group consisting of N,N'-hexane-1,6-diylbis[3-(3,5-di-tert-butyl-4-hydroxyphenyl propionamide)] and 2',3'-bis[3-[3,5-di-tert-butyl-4-hydroxyphenyl]propionyl]hydrazine; and
   (E) an inorganic filler,
   wherein the compatibilizer (C) is a modified polyphenylene ether polymer,
   wherein the amount of the polystyrene resin (B) is 10.0% by weight or more and 30.0% by weight or less, the amount of the compatibilizer (C) is 1.5% by weight or more and 3.5% by weight or less, and the amount of the hindered phenol compound (D) is 0.3% by weight or more and 1.0% by weight or less per 100% by weight of the total amount of the components (A) to (E).

2. The polystyrene resin composition according to claim 1, wherein when the amount of the polyamide (A) is denoted by x % by weight and the amount of the polystyrene resin (B) is denoted by y % by weight per 100% by weight of the total amount of the components (A) to (E), x is larger than y.

3. The polystyrene resin composition according to claim 1, wherein the amount of the polyamide (A) is 40.0% by weight or more and 80.0% by weight or less per 100% by weight of the total amount of the components (A) to (E).

4. The polystyrene resin composition according to claim 1, wherein the amount of the inorganic filler (E) is 25.0% by weight or more and 50.0% by weight or less per 100% by weight of the total amount of the components (A) to (E).

5. The polystyrene resin composition according to claim 1, wherein the hindered phenol compound (D) is N,N'-hexane-1,6-diylbis[3-(3,5-di-tert-butyl-4-hydroxyphenyl propionamide)].

6. The polystyrene resin composition according to claim 1, wherein the inorganic filler (E) is a glass filler.

7. A molded product comprising the polystyrene resin composition according to claim 1.

8. The polystyrene resin composition according to claim 1, wherein the polystyrene resin composition is free of a polyolefin.

* * * * *